US008696301B2

(12) United States Patent
Smith

(10) Patent No.: US 8,696,301 B2
(45) Date of Patent: Apr. 15, 2014

(54) APPARATUS FOR EXTRACTING ENERGY FROM FLOWING WATER

(76) Inventor: Neville Alan Smith, Gold Coast (AU)

( * ) Notice: Subject to any disclaimer, the term of this patent is extended or adjusted under 35 U.S.C. 154(b) by 876 days.

(21) Appl. No.: 12/808,780

(22) PCT Filed: Dec. 19, 2008

(86) PCT No.: PCT/AU2008/001887
§ 371 (c)(1),
(2), (4) Date: Jun. 17, 2010

(87) PCT Pub. No.: WO2009/076726
PCT Pub. Date: Jun. 25, 2009

(65) Prior Publication Data
US 2010/0259048 A1 Oct. 14, 2010

(30) Foreign Application Priority Data
Dec. 19, 2007 (AU) .............................. 2007906923

(51) Int. Cl.
*F03B 13/10* (2006.01)
*F03B 3/18* (2006.01)

(52) U.S. Cl.
USPC ............. 415/4.3; 415/4.5; 415/906; 415/908; 416/86

(58) Field of Classification Search
USPC .......... 415/2.1, 4.1, 4.3, 4.5, 7, 906, 908, 3.1; 290/42, 43, 53; 416/85, 86
See application file for complete search history.

(56) References Cited

U.S. PATENT DOCUMENTS

| 583,355 | A | * | 5/1897 | Barton et al. ...................... 415/7 |
| 1,071,225 | A | * | 8/1913 | Giffhorn ............................ 415/7 |
| 1,368,454 | A | * | 2/1921 | Rebman .......................... 416/85 |
| 1,396,609 | A | * | 11/1921 | Weisenborn ..................... 415/7 |
| 3,883,750 | A | * | 5/1975 | Uzzell, Jr. ...................... 290/55 |
| 4,213,734 | A | * | 7/1980 | Lagg .............................. 415/4.3 |
| 4,248,044 | A | * | 2/1981 | Woodilla ........................ 60/398 |
| 4,446,378 | A | * | 5/1984 | Martinez Parra ............... 290/54 |
| 4,478,166 | A | * | 10/1984 | Sorensen ....................... 114/290 |
| 4,649,851 | A | * | 3/1987 | April ............................. 114/271 |
| 5,281,856 | A |   | 1/1994 | Kenderi |
| 5,497,722 | A | * | 3/1996 | English, Sr. .................... 114/62 |
| 5,522,333 | A | * | 6/1996 | Lang et al. ................. 114/61.12 |
| 5,603,280 | A | * | 2/1997 | Shackelford, Jr. ....... 114/230.27 |
| 6,806,586 | B2 | * | 10/2004 | Wobben ......................... 290/54 |
| 7,116,005 | B2 | * | 10/2006 | Corcoran, III ................. 290/43 |
| 7,322,307 | B1 | * | 1/2008 | Perry ............................ 114/219 |
| 2003/0133782 | A1 | * | 7/2003 | Holter et al. ................... 415/4.2 |
| 2008/0231057 | A1 | * | 9/2008 | Zeuner ........................... 290/54 |

FOREIGN PATENT DOCUMENTS

| CN | 2931838 | Y |   | 8/2007 |
| CN | 200975312 | Y |   | 11/2007 |
| GB | 2436704 | A | * | 10/2007 |

* cited by examiner

*Primary Examiner* — Edward Look
*Assistant Examiner* — Jason Davis
(74) *Attorney, Agent, or Firm* — Rabin & Berdo, P.C.

(57) ABSTRACT

Apparatus (10) for extracting energy from flowing water typically a tidal stream flow, the apparatus including a float assembly (41) having pair of spaced buoyant bodies (42) between which an elongated flow passage or tunnel (47) is located with an impeller assembly (61) in the flow passage (47) which can drive an electrical generator (76) on the float assembly (41). The bodies (42) include or define ballast tanks which can be filled or partially filled with water to submerge the flow passage or tunnel (47).

19 Claims, 10 Drawing Sheets

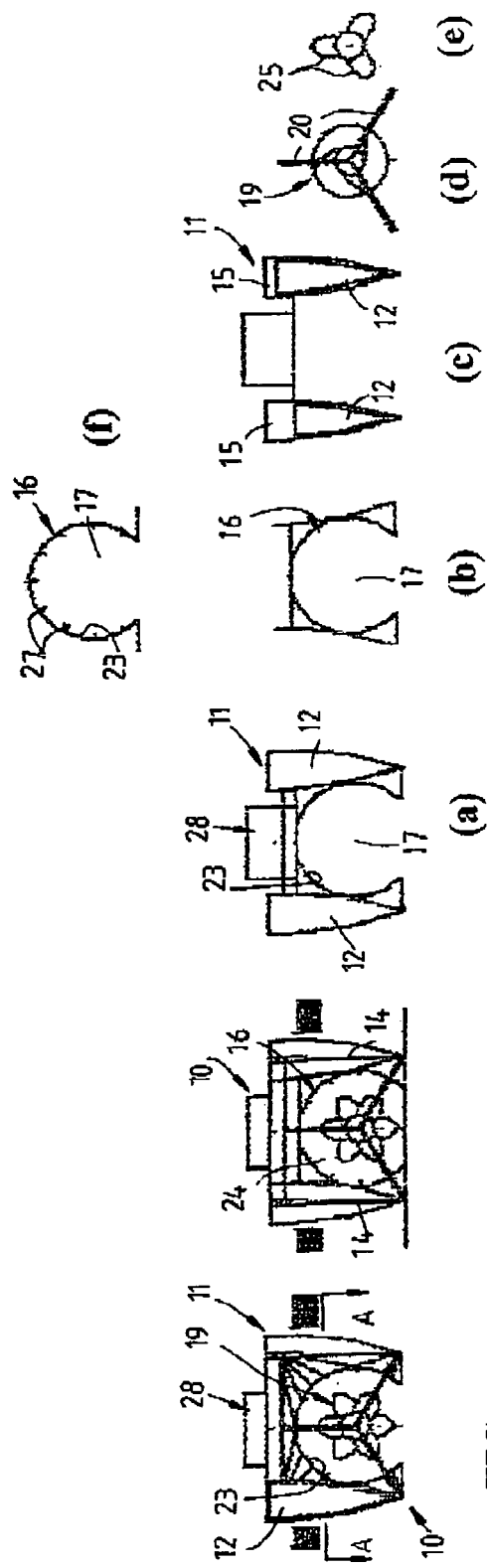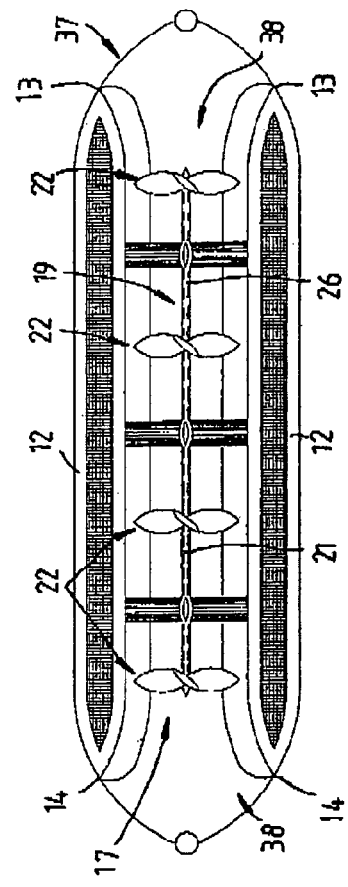

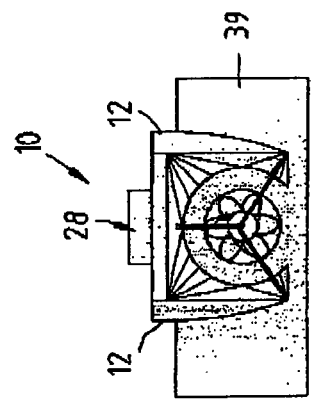
FIG. 9
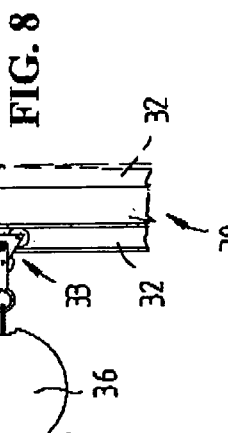
FIG. 7
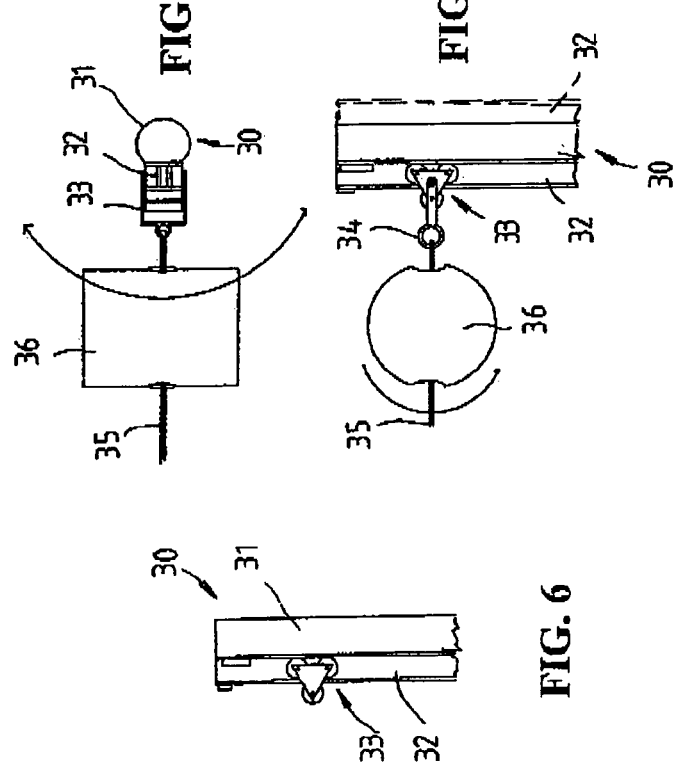
FIG. 8
FIG. 6

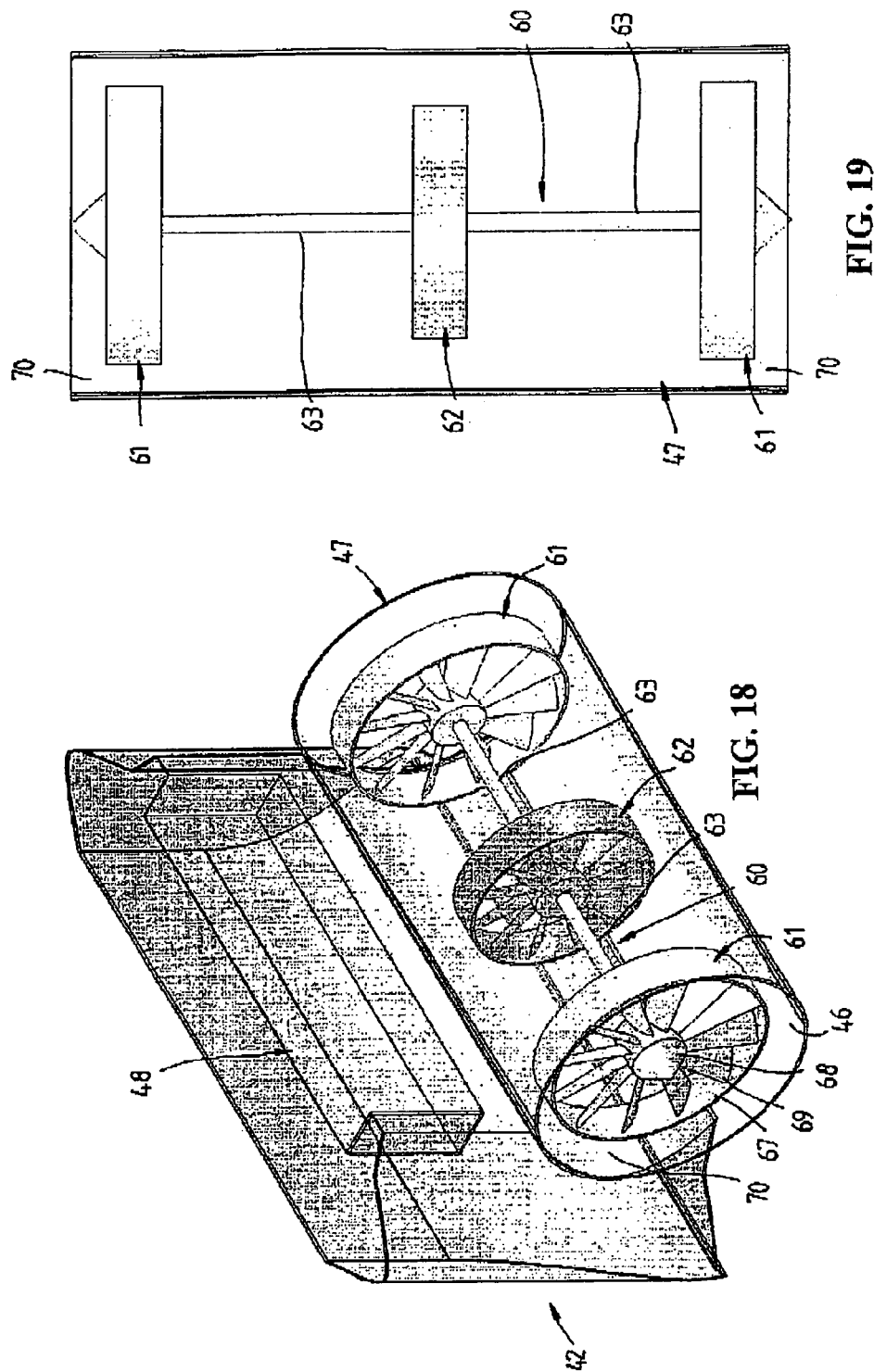

APPARATUS FOR EXTRACTING ENERGY FROM FLOWING WATER

TECHNICAL FIELD

This invention relates to apparatus for extracting energy from flowing water and in particular to apparatus for extracting energy from a tidal stream flow. Whilst the apparatus of the invention however is particularly suitable for extracting energy from flowing water caused by tidal changes, it will be appreciated that the apparatus of the invention may be applied to the extraction of energy from any flowing water whether caused by tides or otherwise and accordingly reference to tidal flow throughout the specification includes any form of water flow.

BACKGROUND ART

Many different forms of tidal generators have been proposed in the past and are in use. Tidal flow generators which are currently known or in use have disadvantages. In particular some of the known tidal generators are not particularly efficient. Other tidal generators are subject to damage if operating in a region where debris or other foreign objects may be encountered. Yet other tidal generators can become damaged if the level of water in which they are operating suddenly drops which cases the generator to sit on the bottom surface of the body of water.

SUMMARY OF THE INVENTION

The present invention aims to provide improved apparatus for extracting energy from flowing water which overcome or alleviate one or more of the above disadvantages or which at least provides an effective alternative to the known tidal flow generators. Other objects and advantages of the invention will become apparent from the following description.

The present invention thus provides in one aspect although not necessarily the broadest aspect, apparatus for extracting energy from flowing water, said apparatus comprising a float assembly having pair of spaced bodies, said bodies being at least partially buoyant, an elongated flow passage between said bodies and extending longitudinally thereof, an impeller assembly in said flow passage, said apparatus being adapted to be at least partially submerged in a body of water to submerge said flow passage, said impeller assembly being caused to rotate upon flow of water through said passage, and means on said float assembly for extracting energy from said rotating impeller assembly.

Preferably the bodies have a variable buoyancy to enable the apparatus to be submerged or partly submerged in the water. The bodies may comprise hollow ballast tanks or chambers which may be selectively filled or emptied of water. A selectively operable pump or pumps may be provided for filling the ballast tanks or chambers or emptying water from the ballast tank or tanks. For emptying water from the bodies, the pump or pumps may comprise bilge pumps. The water for filling the tank or tanks is suitably derived from the body of water in which the apparatus is located.

The bodies of the float assembly may comprise a pair of spaced floats, pontoons or hulls (hereinafter all referred to as "floats") whereby the float assembly may be in the configuration of a catamaran. The spaced floats may define at least part of the inner wall of the flow passage. For this purpose, each float has an inner wall and the inner wall of the float defines a concave surface which forms at least part of the inner surface of the flow passage with concave surfaces of the respective floats opposing each other. Typically the flow passage is of a substantially circular cross-section and the concave surfaces of the float may be part-circular in cross-section.

Alternatively the flow passage may be defined by an elongated flow passage defining member supported between the floats. The flow passage defining member may comprise a tubular or part tubular member so as to be of a tunnel-like configuration. The flow passage defining member may be open on its lower side or fully enclosed around its periphery.

Suitably the floats extend downwardly to be level with or extend below the lower side of the flow passage and impeller such that if the floats seat on a surface such as the bed of the river or bay in which the apparatus is located, the flow passage defining means and impeller assembly will not be damaged. This will allow the apparatus to be used in regions of a large tidal range.

Preferably the bows of the floats define a tapering throat leading into the flow passage to assist in direct flowing water between the floats and through the flow passage. The stems of the floats may have a similar configuration such that the apparatus may operate in bodies of water where tidal action causes stream flows relative to the float assembly in opposite directions. The leading and trailing ends of the float assembly may also taper in cross section towards the flow passage to direct water flow towards the flow passage. In a particularly preferred configuration, the leading and/or trailing ends of the float assembly may flare outwardly conically.

Preferably the float assembly includes at least at its operative leading end, an end member which projects forwardly of the float assembly above the flow passage, the end member tapering forwardly to be in the configuration of the bow of a boat. A similar end member may be provided at the trailing end of the float assembly. The end members reduce the impact of waves on the float assembly. The or each bow-like end member is suitably provided between the opposite bodies of the float assembly and extend outwardly and longitudinally thereof. The bow-like end members are suitably sealed hollow chambers and/or formed or filled at least partially of a buoyant material such as a foam plastics.

Preferably a guard or shield is provided at the leading and/or trailing ends of the float assembly to prevent larger debris, animals or other materials passing into the flow passage. The guard or shield may be in the configuration of a cage may comprise a plurality of bars or other elongated members which extend across the front and rear of the tunnel or passage.

The flow passage is suitably of a constant cross section throughout its length however it may have a varying cross section as referred to below. Suitably the impeller assembly has a maximum diameter of up to 85% and preferably 80% of the cross-section of the flow passage.

Suitably the impeller assembly comprises an elongated impeller assembly supported centrally within the flow passage defining means. The impeller assembly may be bi-directional such that it will operate efficiently irrespective of the direction of flow through the flow passage.

The impeller assembly suitably comprises an elongated shaft assembly and a plurality of blade assemblies arranged at spaced positions along the shaft assembly, each blade assembly having a plurality of blades. The blade assemblies may be in the form of rotors having an inner hub, an outer ring and blades extending between the hubs and ring.

The blade assemblies are suitably mounted for rotation with the shaft assembly and set at a pitch to extract maximum energy from the flowing water. Clutch means may be provided between the respective blade assemblies such that the rotation of one blade assembly or rotor is independent of the rotation of other blade assemblies or rotors whereby the rotation of one blade assembly or rotor will not affect the rotation of the other blade assemblies or rotors. Respective clutch assemblies may be provided between each blade assembly or rotor and shaft assembly. The clutch assemblies may be selectively engaged or disengaged.

The pitch of the blades of each blade assembly or rotor may be selectively adjustable to ensure that maximum energy can be extracted from the flowing water by driving the drive shaft at a maximum rotation or so that the blades can be feathered for example for servicing purposes.

The rotors or blade assemblies may comprise rotors or blade assemblies at opposite ends of the flow passage and at least one intermediate rotor or blade assembly therebetween. The or each intermediate rotor or blade assembly rotor suitably is of a smaller diameter than the opposite end rotors. The flow passage may be reduced in diameter for example by being constricted or waisted adjacent the or each intermediate rotor or blade assembly to maintain substantially the same gap between the rotors or blade assemblies and the side walls of the flow passage.

Preferably the shaft assembly of the impeller assembly is coupled to an output shaft preferably via a right angled gearbox such as a ring gear and pinion gear box and the output shaft is adapted to drive the energy extracting means. The energy extracting means suitably comprises an electrical generator. The output shaft may be coupled to the generator through a clutch. The polarity of the generator may be reversed depending upon the direction of flow of water and thus the direction of rotation of the impeller assembly.

The generator is suitably located in a housing on the upper side of the float assembly. The housing is suitably substantially water-tight to prevent water for example flowing over the ends of the float assembly reaching the generator within the housing. The housing is suitably located within a recess in the upper side of the float assembly. The recess is suitably at least partially defined in the bodies.

The float assembly may be constructed of any suitably material such as timber, glass reinforced plastics, or metal such as aluminium.

BRIEF DESCRIPTION OF THE DRAWINGS

In order that the invention may be more readily understood and put into practical effect, reference will now be made to the accompanying drawings which illustrate a preferred embodiment of the invention and wherein:

FIG. 1 is a front view of apparatus for extracting energy from tidal stream flow according to an embodiment of the present invention;

FIG. 2 is a rear view of the apparatus of FIG. 1;

FIGS. 3 (a)(b)(c)(d)(e) and (f) illustrate in front view the components of the apparatus of FIG. 1;

FIG. 4 is a partly sectioned side view of the apparatus of FIG. 1;

FIG. 5 is an enlarged sectional view of the apparatus along line A-A of FIG. 1;

FIG. 6 is a side view of a pile assembly for tethering the apparatus of the invention;

FIGS. 7 and 8 illustrate in plan and side view respectively, the manner in which the apparatus may be tethered;

FIG. 9 is a front view illustrating the apparatus operating in a body of water;

FIG. 18 illustrates the relationship between a pontoon of the apparatus and the flow tunnel or passage;

FIG. 19 is a plan view of the tunnel and rotor assembly;

DETAILED DESCRIPTION OF THE PREFERRED EMBODIMENT

Figure 13:
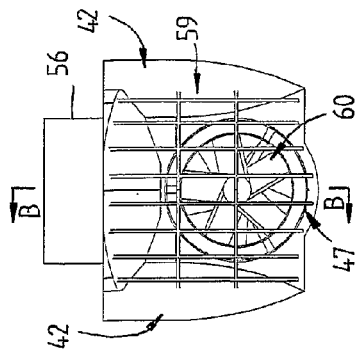
FIGS. 12, 13 and 14 are side end and top view of the apparatus of FIG. 10; according to an embodiment of the present invention.
Figure 12:
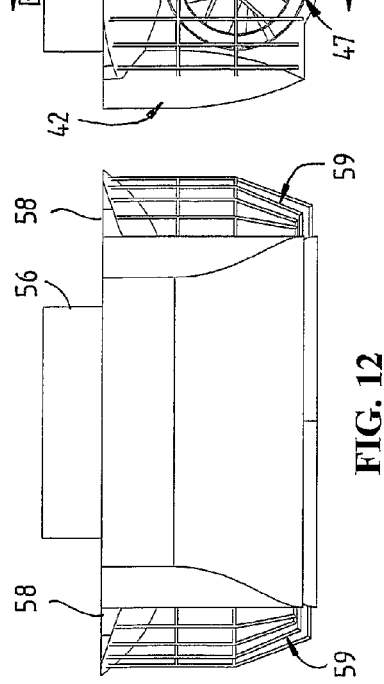
Figure 14:
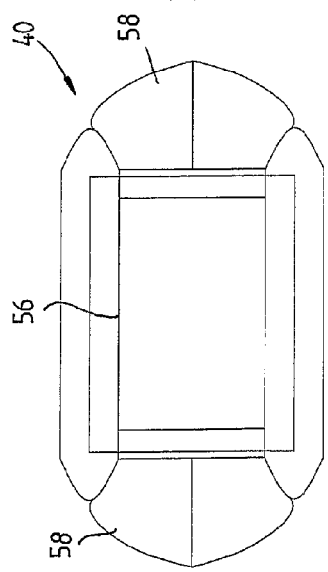
Figure 10:
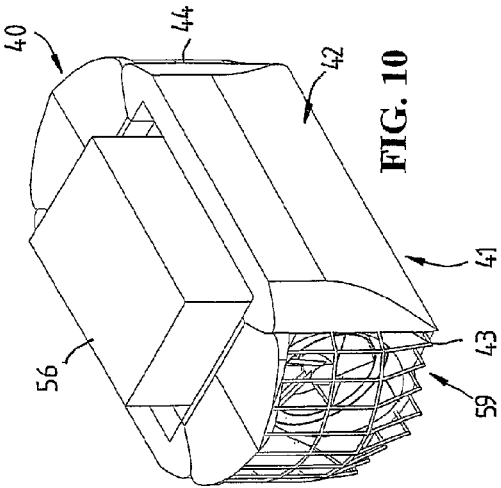
FIGS. 10 and 11 are isometric views from above and below of a second embodiment of apparatus for extracting energy from tidal stream flow.
Figure 11:
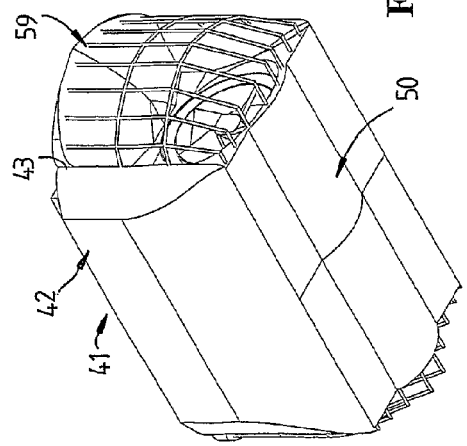

Referring to the drawings and firstly to FIGS. 1 to 3, there is illustrated apparatus 10 for extracting energy from tidal stream flow or other flow of water according to an embodiment of the invention, the apparatus including a hull assembly 11 which is of catamaran configuration and which comprises a pair of space apart hulls 12. The hulls 12 have at least a tapering bow 13 (and preferably also a tapering stern 14 as shown in FIG. 5) so that the hull assembly 11 can operate in a flow of water towards the bow 13 or stern 14 without varying the orientation of the hull assembly 11. In addition, the hulls 12 are capable of being at least partially or fully submerged in the water in which the apparatus 10 is located. For this purpose, each hull 12 is provided with one or more ballast tanks or chambers 15 (see FIG. 3(c)). A pump or pumps (not shown) is/are connected to the tanks or chamber/s 15 and may be operated to fill the chambers or tanks 15 on the respective hulls 12 simultaneously with water to at least partially sink the hulls 12. The tanks or chambers 15 may also be emptied of water to remove the ballast weight provided by the water in the tanks or chambers 15.

Supported between the hulls 12 and extending longitudinally thereof is a hollow flow passage defining member or tunnel 16 which defines an elongated flow channel or passage 17 of part-circular cross section, the channel or passage 17 being open on its lower side. As is apparent in FIGS. 1 and 2, 3(a) and (b), the member 16 is positioned so that it does not extend below the hulls 12 and therefore does not increase the normal draft of the hull assembly 11.

Mounted rotatably in the flow channel 14 is an impeller assembly 19 (see FIGS. 4 and 5) which is supported for rotation about a longitudinally extending axis by radially extending struts 20 at opposite ends of the hull assembly 11 (and at spaced positions along the impeller assembly 19 if required). The impeller assembly 19 comprises a central fixed elongated support 21 and a plurality of blade assemblies 22 arranged at spaced positions along the support 21. As is apparent in FIGS. 1, 2, 4 and 5, the blade assemblies 22 have a maximum diameter so as to be spaced radially inwardly from the part circular wall 23 of the flow channel 17. Typically the maximum diameter of the blade assemblies 22 is 60%-85% of the diameter of the flow channel 17. This effectively defines, a gap 24 between the outer diameter of the blade assemblies 15 and the wall 23 of the flow channel 17 to create a venturi-like effect and ensure that water accelerates through the gap 24. In addition, the gap 24 allows the passage of marine life or foreign objects or other materials in the water without damaging the impeller assembly 19.

Each blade assembly 22 includes a plurality of radially extending blades 25. The blades 25 may have a fixed pitch selected to provide maximum energy extraction in accordance with the expected flow rate of the body of water in which the apparatus is operating. Alternatively, the blades 25 may be varied in pitch by an adjustment mechanism on the support 21. Thus the angle of the blades 25 can be varied between a fully feathered inoperative position to a position where maximum energy can be extracted from the flowing water. The blade assemblies 22 are connected to a bearing-mounted common drive shaft 26 (shown in dotted outline in FIG. 5) which extends longitudinally of and within the support 21. The angle of pitch of the blades 25 of the respective blade assemblies 22 can be adjusted by the respective adjustment mechanisms to effect maximum rotation of the shaft 26 and therefore extract maximum energy from the flowing water. The blade assemblies 22 are also connected to the shaft 26 by respective clutches or similar transmission device (not shown) which will permit one blade assembly 22 to rotate at a different velocity to the other blade assemblies 22 whilst at the same time permitting drive to be transmitted from each blade assembly 22 to the shaft 26. The transmission devices for example may comprise hydraulic transmission devices or mechanical devices.

Blades 25 of the blade assemblies 22 may be provided with outwardly projecting fins or the like on their operative faces to increase power transfer from the flowing water to the blade assemblies 22. The fins will reduce slippage of water off the faces of the blades 25.

The elongated support 21 is suitably of a sufficient diameter as to spread the water and create an increased pressure within the flow channel 17. The support 21 however is not of a diameter to create a bow wave in operation.

Further efficiency of energy extraction is achieved by providing a series of circumferentially spaced vanes 27 on the inner wall 23 of the channel 17 as shown in FIG. 3 (f), the vanes 27 projecting a short distance radially inwardly of the channel wall 23 and extending substantially parallel to the axis of the flow channel 17. The vanes 27 will prevent the spiralling of water through the channel 17 due to rotation of the impeller assembly 19 so that the more downstream blade assemblies 22 operate with increased efficiency.

The shaft 26 of the impeller assembly 19 is connected via a directional gearbox at the correct gearing to drive a generator 28 located on the top of the hull assembly 11. The generator 28 is located inside an enclosed generator housing 29 which shelters the generator 28 from the elements. If cooling of the generator 28 is required, an electric heat exchanger or a radiator system cooled by the water in which the apparatus 10 is located may be used. The generator 28 may be any known off the shelf generator of a size and capacity which depends on size of apparatus 10, the location in which the apparatus 10 to be used and water flow available at that location.

Depending on the size of the apparatus 10 and its proposed siting which may have different tidal flow, an additional source of priming or self starting may be required to engage the generator 28 to enable the generator 28 to start. In this arrangement, the drive from the shaft 26 is diverted through the drive train provided by the gearbox to an hydraulic motor/pump combination. The hydraulic output from the pump will be supplied to an hydraulic accumulator and a second hydraulic motor is coupled to the generator 28, the second hydraulic motor receiving hydraulic fluid at a preset accumulator pressure to enable the second hydraulic motor to kick start the generator 28. As the kick start is engaged, the drive from the shaft 26 will be engaged through a clutch system with the generator 28 such that continuing rotation of the impeller assembly 19 will directly drive the generator 28 through the gearbox. The hydraulic motor drive system will also register the direction of flow/drive and will be set up to engage the direction gear required for the direction of flow.

The floating apparatus 10 is preferably set up in one directional flow system (rivers or units on swing moorings) so that the apparatus 10 will not need a reverse gear system and depending on flow/pressure will determine whether an accumulator and hydraulic motor system will be needed.

A pile assembly 30 from which the apparatus 10 may be moored is illustrated in FIGS. 6 to 8, the pile assembly 30 comprising an upstanding pile 31 which may be driven into the bed of a river or other body of water, the pile 31 supporting an upstanding track 32 on the normally downstream side thereof. A rolling carriage 33 is captured to the track 32 for movement in a vertical direction therealong in opposite directions. The carriage 33 includes a locating eye 34 to which a holding stay 35 is connected, the holding stay 35 being coupled to the bow of the hull assembly 11. The stay 35 passes through or is connected to a float 36 adjacent to the pile, the float 36 causing the carriage 33 to move up and down along track 32 with the water level for example due to tidal level changes. A shock absorber 37 (see FIG. 5) may be provided between the bow of the hull assembly 11 and pile 30 to minimise the risks of breakage through wave movement and or any contact with any unforeseen object. As shown in dotted outline in FIG. 8 a further track 32 may be provided on the opposite side of the pile assembly 30 to guide a further carriage 33 such that one apparatus 10 may be coupled to one side of the single pile assembly 30 and one apparatus 10 to the other side of the pile assembly 30 such that one apparatus 10 can move up and down with the respective carriages 33 along the tracks 32 independently of the other apparatus 10.

The hull assembly 11 may be held in position in the flow/current of water using different arrangement from that described above. For example, the hull assembly 11 can be moored to a swing mooring such that the bow 13 (or stern 14) is always pointing into the oncoming flow. This will occur whether the hull assembly 11 is tethered from the bow end or stern end onto a pile located forward of the craft. Using a mooring of this type, when the tide changes, the hull assembly 11 swings around the pile to be pointing into the direction of the flow.

In another arrangement using the hull assembly 11 as described above having a double ended configuration with a similar how configuration to the stern configuration, both ends of the hull assembly 11 can be secured/moored between four piles or piers 30 of the type described with reference to FIGS. 6 to 8 having raising and lowering carriages 33 adjusted by floats which rise and fall to match the tide. With this form of mooring, a series of apparatuses 10 can be staggered or placed in line to utilize the piers 30 for more than one apparatus. The piles or piers 30 are located at each corner of the apparatus 10 at the bow and at the stem. Alternatively one pile or pier 30 may be provided at the bow and one pile or pier 30 provided at the stern. As the front and rear of the hull assembly are mirror images, when the tide is coming in, the bow of the hull assembly 11 points into the flow and when the tide is going out, the stern 14 points into the flow with the bow 13 now the effective stem of the hull assembly 11. The blades 25 of the blade assemblies 22 may be reversed automatically in pitch or selectively as required by means known in the art depending upon the direction of flow which ensures that the generator 28 operates in either direction.

In yet another arrangement for mooring, the apparatus 10 may be tethered in a similar manner to a boat mooring pontoon or may comprise a pontoon with the apparatus 10 tethered/secured by the bow 13 to either the river/estuary bank or pier and another arm secured substantially at right angles from the hull assembly 11 to the bank. The right angled arm can serve as a gang plank walkway for easy-access to the apparatus 10 for servicing etc. The walk-way/plank is hinged to rise up and down with the tide and the bow tether also maintains the apparatus in position.

When the apparatus 10 is in operation as shown in FIG. 9, the hull assembly 11 is ballasted such that it will float semi-submerged in a body of water 39 and up and down with the tide. The hulls 12 are preferably sufficiently sunk by filling the ballast tanks 15 as to reduce the effects of wind or waves and typically may be sunk at least to the upper level of the impeller assembly 19 and most preferably such that the flow channel or passage member 16 is fully submerged. The ballast tanks or chambers 15 can be filled or part filled with water to position the craft down in the water to ensure that the impeller assembly 19 is fully submerged. Should there be no water at low tide, the hull assembly 11 will settle on the bed of the sea, river, or estuary in which the apparatus 10 is located and as the flow channel or passage member 16 is above the lower part or keel of the hull assembly 11, it and the impeller assembly 19 contained therein will not be damaged. When water, returns the hull assembly 11 will rise as the water level increases.

As water flows past the hull assembly 11, the opposite sides of the tapering hulls 12 of the hull assembly 11 at the bow 13 (or stern 14) forms a tapering throat 38 to create a funnel and channel the water flow between the floats 12 and through the flow passage 17. Water channelled into the flow passage 17 comes into contact with the impeller assembly 19 and causes by interaction with the blade assemblies 25, rotation of the shaft 26 to drive the generator 28. Because the available cross-sectional area for flow through the passage 17 has been reduced by the impeller assembly 19 therein, more pressure/flow is created due to the restricted area to drive the blade assemblies 25.

The generator 28 may be fitted with a brake, possibly on the final drive to lock generator and impeller assembly 19 to stop rotation for any reason.

The electricity generated by the generator 28 may be passed by cable (via the stay 35 and pile 31 where used), down to the seabed and across to adjoining land and to the required area where the energy is required to be delivered.

Zinc anodes may be applied to the hulls 12 to act as a sacrificial compound to stop fatigue, and rusting or electrolysis.

The impeller assembly 19 may be substantially varied in configuration and design for maximum energy extraction. The impeller assembly 19 may include any number of blade assemblies 22 and the blade assemblies 22 may be of various designs.

The hull assembly 11 may be constructed of any suitable materials such as timber, glass reinforced plastics, aluminium or any other material or combination of materials. The impeller assembly and components thereof and components associated therewith are suitable constructed of a corrosion resistant material such as stainless steel.

Referring to FIGS. 10 to 16, there is illustrated apparatus 40 for extracting energy from tidal stream flow or other flowing, typically rapidly flowing, water according to another embodiment of the invention, the apparatus 40 being similar to the apparatus 10 of FIGS. 1 to 9 and including a buoyant body or float assembly 41 which comprises a pair of hollow pontoons 42 one of which is a mirror image of the other. The pontoons 42 have a tapering bow 43 and stem 44 however the bow 43 may comprise the stern 44 and vice versa depending upon the direction of water flow. The pontoons 42 additionally have, as shown more clearly in FIGS. 17 and 18 longitudinally extending concave surfaces 45 which form part of the internal wall 46 of a tunnel or flow passage 47 of substantially circular cross section. The pontoons 42 also have recess 48 in their upper side.

Figure 15:
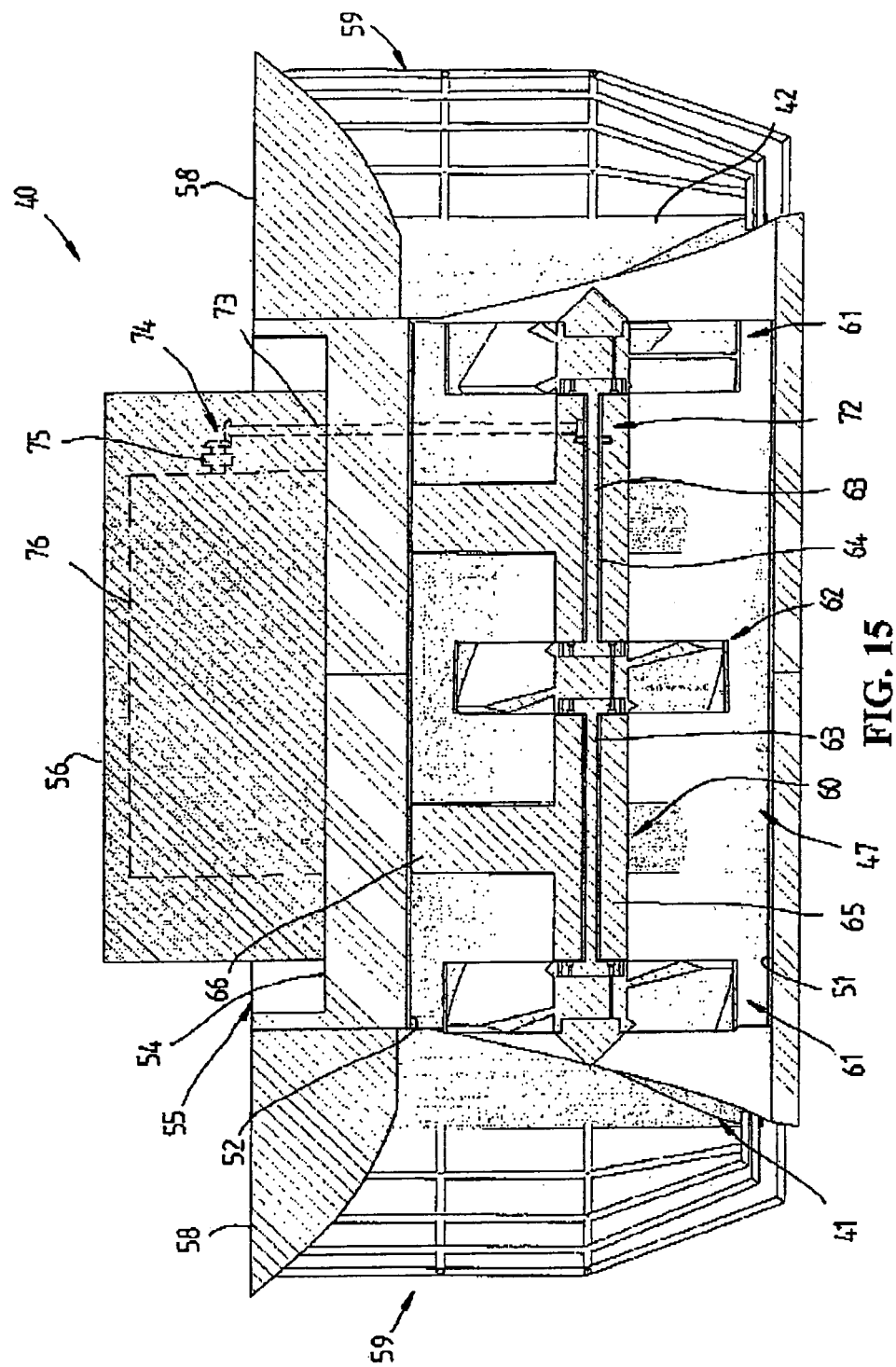
FIG. 15 is an enlarged longitudinal sectional view of the apparatus of FIGS. 10 and 11 along line B-B of FIG. 13.
Figure 16:
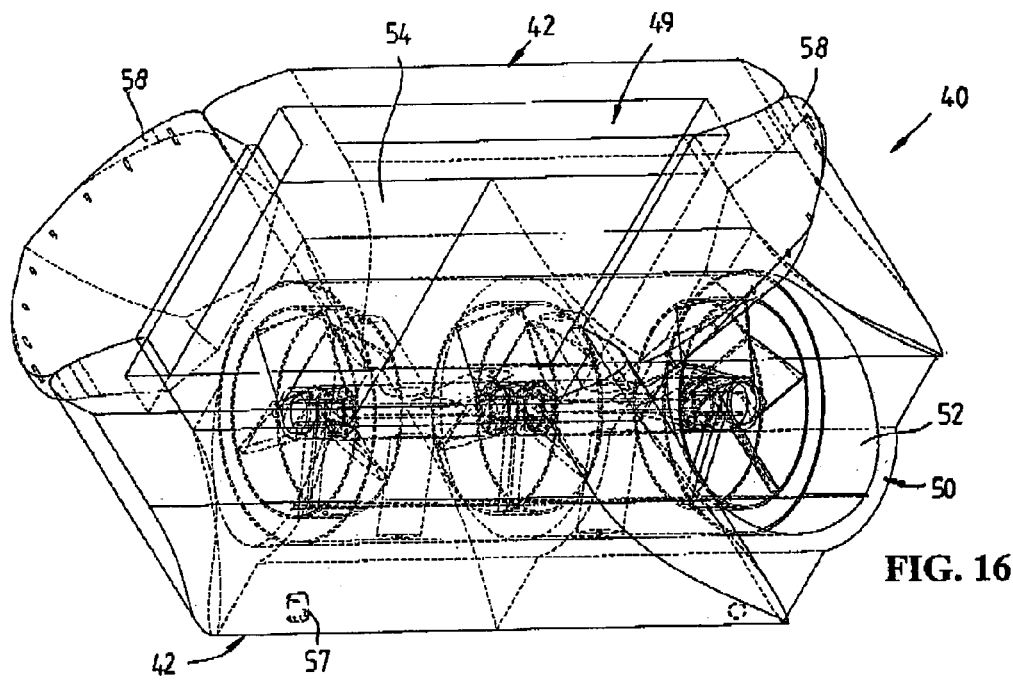
FIG. 16 is an isometric cut-away view from the above of the apparatus of FIGS. 10 to 15 with the deflectors removed and the generator housing absent.
Figure 17:
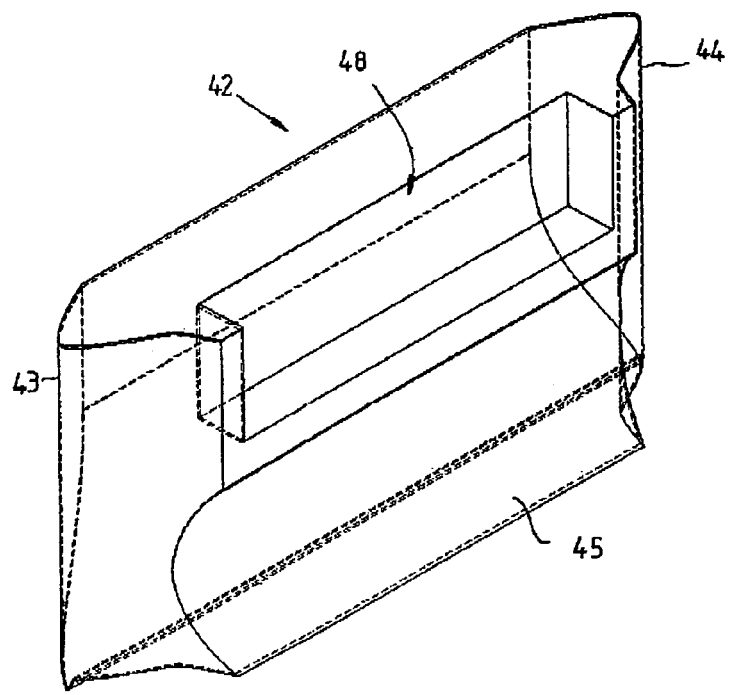
FIG. 17 is an isometric view of a pontoon of the apparatus of FIGS. 10 to 15.

A pair of hollow pontoons 42 are arranged in opposing relationship to each other as shown in FIG. 16 and upper and lower infill sections 49 and 50 are provided between the pontoons 42, the sections 49 and 50 having inner curved wall surfaces 51 and 52 (see FIG. 15) of the same radius as the surfaces 45 to form further parts of the circular internal wall 46 of the tunnel 47 and which when combined with the surfaces 45 define the inner closed periphery of the tunnel 47 (unlike the tunnel or flow passage configuration of the apparatus 10 of FIGS. 1 to 9). The upper section 49 may also include a floor section or sections 54 which spans the opposite recesses 48 and defines with the recesses 48 an enlarged upper recessed chamber 55 in the apparatus 40 which is adapted to carry an electrical generator within a generator housing 56 (see FIGS. 10 to 15). The inner curved sides of the bow 43 and 44 of the pontoons 42 and upper and lower surfaces of the float assembly 41 at the leading and trailing end of the float assembly 41 define tapering entrances into the leading and trailing ends of the tunnel 47 to assist in guiding water into the tunnel 47. The tapering entrance may be of a frusto-conical configuration of a cross section which increases away from the opposite ends of the tunnel 47.

The pontoons 42 are capable of being at least partially or fully submerged in the water in which the apparatus 10 is located and a bilge pump or pumps 57 is/are arranged within each pontoon 42 to pump water from the pontoon 42 to increase pontoon buoyancy. A further pump or pumps (not shown) may be provided to pump water into the pontoons 42 simultaneously, the pontoons 42 serving as ballast tanks, to at least partially sink or submerge the pontoons 42 and apparatus 40.

The apparatus 40 additionally includes tapered end members 58 at the bow and stern of the float assembly 41, the end members 58 being buoyant by being sealed hollow bodies or including a buoyant material such as foamed plastics and are shaped in a similar manner to the bow of a conventional watercraft. The ends 58 will absorb the energy of waves and direct waves to the sides of the float assembly 41 depending upon the direction of flow of water relative to the float assembly 41. The ends 58 are arranged at the upper side of the tunnel 47 and extend outwardly between the pontoons 42 and beyond the bow 43 and stern 44 of the float assembly 40.

Detachable guards 59 are provided at the leading and trailing ends of the buoyant body 41 to span the opposite pontoons 42 and prevent larger objects or animals entering the tunnel 47. The guards 59 may be of any configuration and may be simply in the form of transverse bars extending between opposite pontoons 42 at the front and rear of the apparatus 40 rather than of the caged construction illustrated.

Mounted rotatably in the tunnel 47 is an impeller assembly 60 (see FIGS. 15, 18 and 19) which is supported for rotation about a longitudinally extending axis and centrally within the tunnel 47. The impeller assembly 60 in this embodiment includes a pair of opposite similar end impellers or rotors 61 and a central impeller or rotor 62 joined through respective axles 63 or mounted on a common axle 63. Each axle 63 is supported in bearing 64 in an elongated bearing housing 65 which is mounted centrally in the tunnel 47 via radially extending struts 66 which are of aerofoil cross section to minimise resistance to flow through the tunnel 47.

Each impeller 61 (see FIGS. 18 and 19) comprises an outer circular ring 67, a central hub 68 and a plurality of blades 69 which extend radially between the hub 68 and ring 67. The other impeller 62 is of a similar construction. The rings 67 have a maximum diameter so as to be spaced radially inwardly from the circular wall 46 of the tunnel 47. Typically the maximum diameter of the ring 67 of the front and rear impellers 62 is 60%-85% of the internal diameter of the tunnel 47 to form gaps 70 between the rings 67 and the wall 46 of the tunnel 47 to create a venturi-like effect and ensure that water accelerates through the gap 70 and further to allow for the passage of marine life or foreign objects or other materials in the water without damaging the impeller assembly 60. In a typical configuration, the wall 46 has an inner diameter of 1 meter and the rings 67 have an outer diameter of 800mm. The central impeller 62 has a smaller maximum diameter than the diameter of the leading and trailing impellers 61. This maintains or enables kinetic energy of water flow through the tunnel 47 to be re-established after loss of energy through the leading impeller 61.

The blades 69 of the respective impellers 61 and 62 are mounted for rotation about their longitudinally axes to enable the pitch of the blades 69 to be varied to suit the flow of water through the tunnel 47. Thus the angle of the blades 69 can be varied or pivoted between a fully feathered inoperative position (where in the blades 69 lie substantially in radial planes extending longitudinally of the tunnel 47) to a position on either side of the feathered position where maximum energy can be extracted from the flowing water. Pitch adjustment of the blades 69 can be automatic according to the flow through the tunnel 47 or the blade pitch can be selectively adjusted for example by different adjustment mechanisms accessible through the tunnel 47. The pitch of the each blade 69 of an impeller can be adjusted simultaneously.

Figure 21:
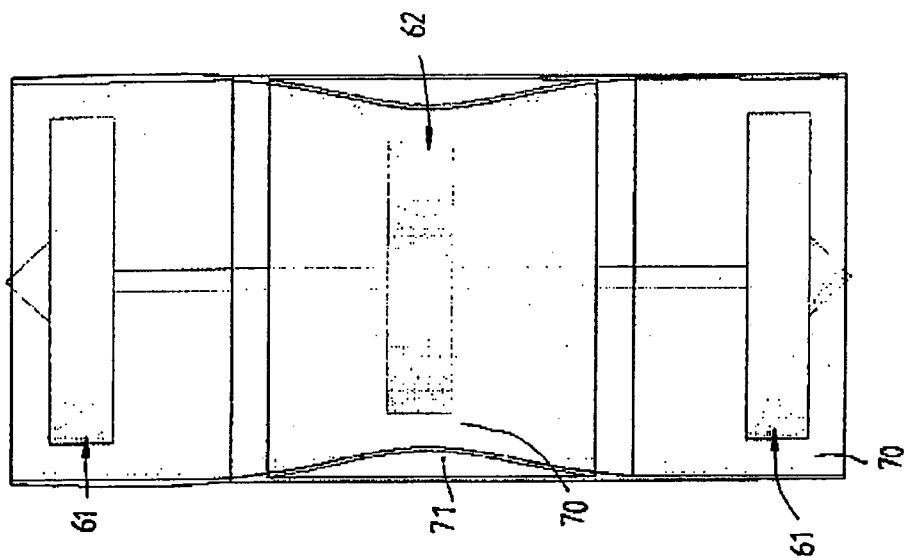
FIGS. 20 and 21 illustrates in isometric and plan view an alternative tunnel configuration and associated rotor assembly.
Figure 20:
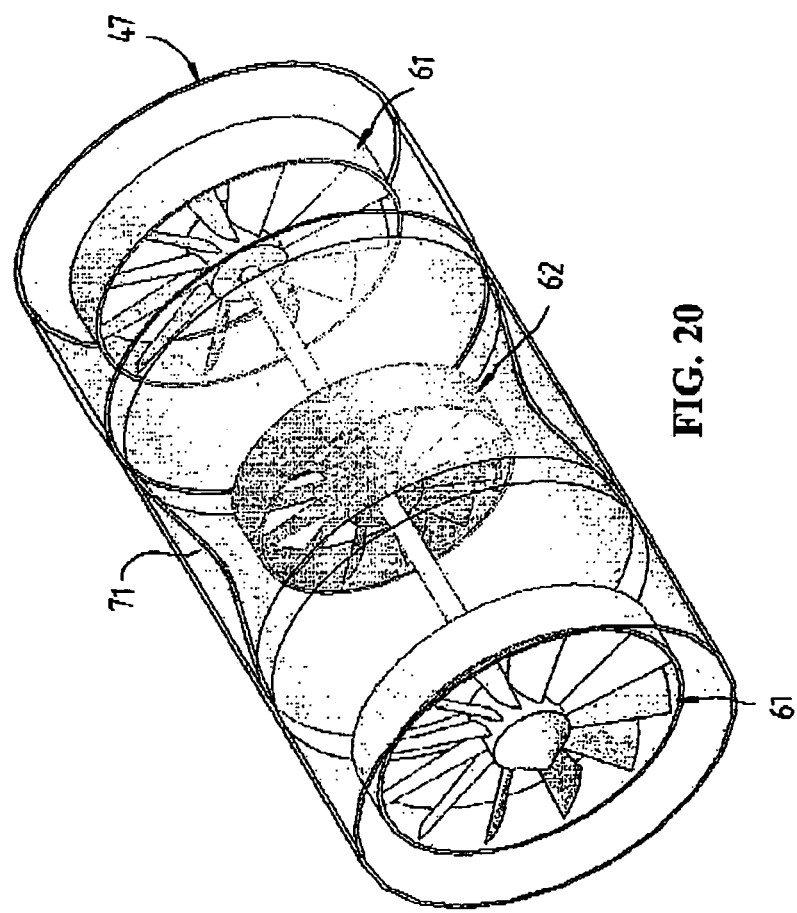

Whilst the tunnel 47 of FIGS. 18 and 19 is of constant diameter through its length, it may be provided with a constriction or waist 71 intermediate its ends and in alignment with the central impeller 62 as shown in FIGS. 20 and 21. This maintains the gap 70 substantially the same for each impeller 61 and 62 and further results in an acceleration of flow past the central impeller 62.

The shaft or shafts 63 of the impeller assembly 60 is connected via a right angled gearbox such as a ring and pinion gear set 72 to a main output shaft 73 which extends upwardly into the generator housing 56 (see FIG. 15). The output shaft 73 is connected by a further right angled gearbox 74 and clutch 75 to an electrical generator 76 located in the housing 56. The generator 76 may be any known off the shelf generator of a size and capacity which depends on size of apparatus 10, the location in which the apparatus 10 to be used and water flow available at that location. As an alternative transmission arrangement, the shaft 63 may be connected via a hydraulic transmission to the generator 76.

Figure 22:
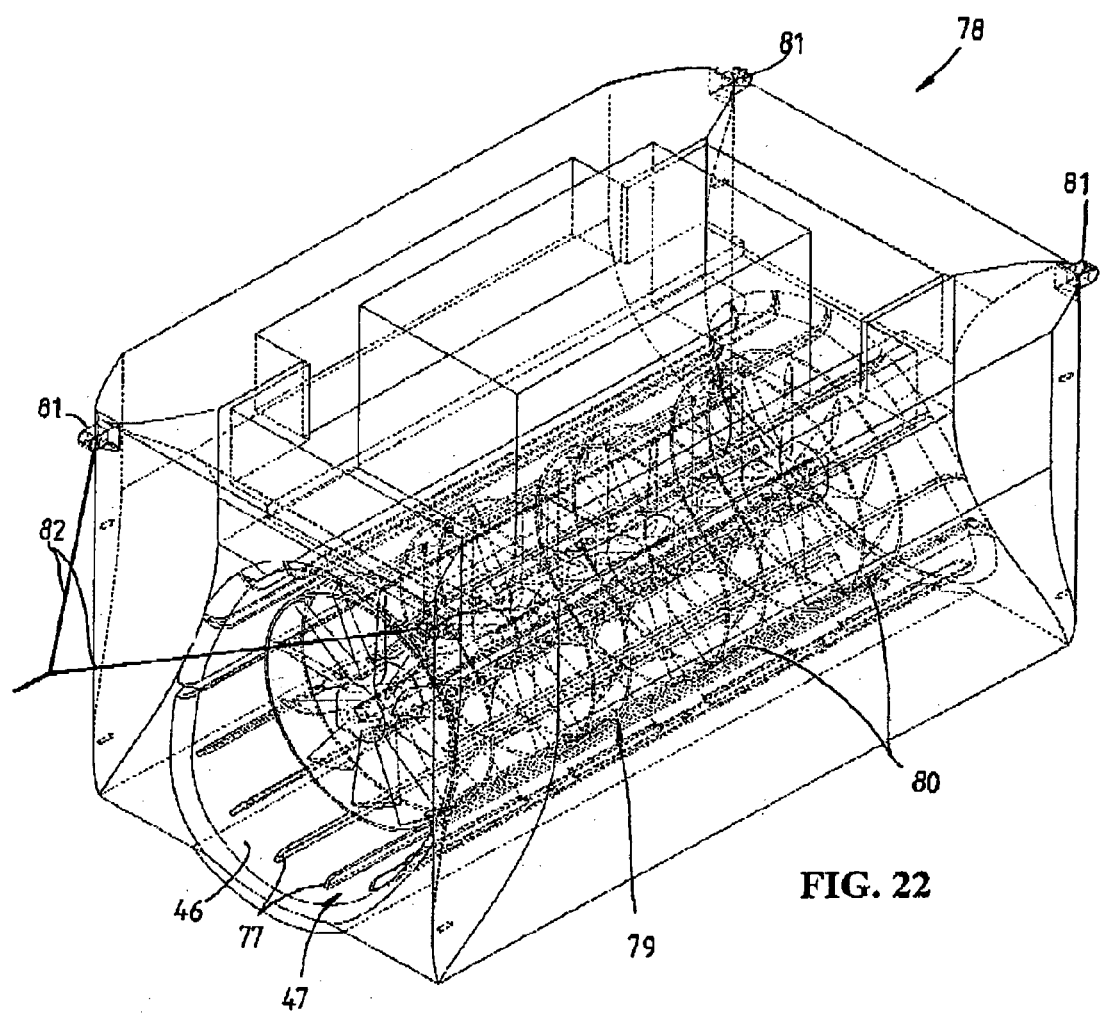
FIG. 22 illustrates in cut away view an alternative apparatus according to the invention.

To prevent spiralling of water through the channel 47 due to rotation of the impeller assembly 60, a plurality of circumferentially spaced vanes 77 may be provided in the channel 47 to extend longitudinally thereof and radially inwardly of the tunnel 47. This is more clearly illustrated in FIG. 22 which illustrates a slightly modified form of energy extraction apparatus 78 which includes an impeller assembly 79 comprising four spaced impellers 80. The vanes 77 which project a short distance radially inwardly of the tunnel wall 46 and substantially parallel to the longitudinal axis of the flow channel 47 ensure that the more downstream rotors 80 operate with increased efficiency. The apparatus 78 of FIG. 22 also includes coupling lugs 81 at its four corners which facilitate lifting of the apparatus 78 into and out of the water by suitable lifting equipment and further can serve as mooring cleats for mooring or anchoring of the apparatus 78 through mooring lines 82.

Figure 23:
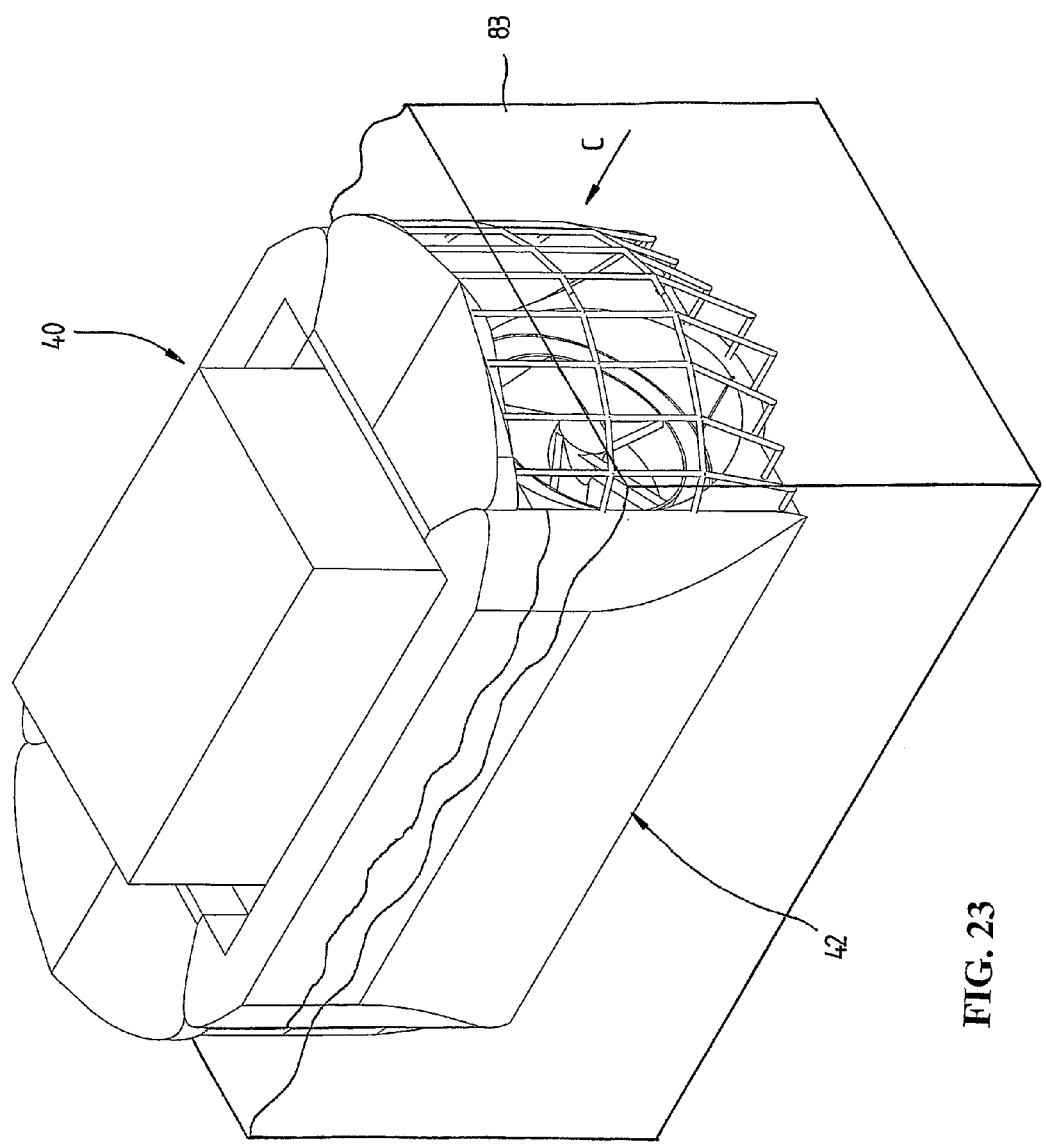
FIGS. 23 and 24 illustrate in isometric and end views the apparatus of FIGS. 10 to 15 in a body of flowing water.
Figure 24:
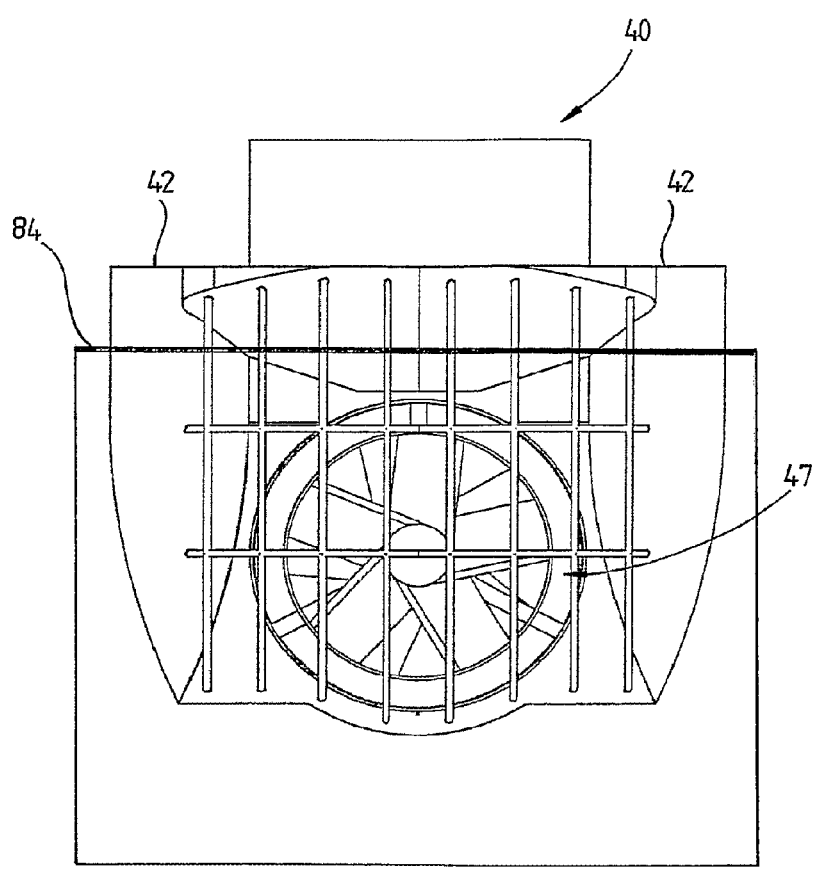

As show in FIGS. 23 and 24, the apparatus 40 (or 78) is located in a body 83 of water in alignment with the direction of flow as indicated by the arrow C. The buoyancy of the pontoons 42 is varied to ensure that the tunnel 47 is fully submerged in the body 83 of water 73 and below the surface level 84 (shown in FIG. 24). Flow of water through the tunnel 47 will cause rotation of the impeller assembly 49 and thus the axles 63 which will be transmitted through the output shaft to the generator 76 for generation of electrical power which may be supplied by suitable cabling to a land based or other use.

The energy extraction apparatus described above may be used as a floatable pontoon in high current areas with a walkway extending to a shoreline or to other pontoons. Multiple apparatuses may be provided as desired and for servicing purposes, the float assemblies may be simply floated to a service location. The apparatus may be used close to a shore as if the water level drops, it will sit on the bed of the river or the like without damaging the impeller assembly.

The pontoons 42 in the described embodiments may have outer skins which define the inner and outer surfaces of the pontoon and which define the internal hollow chambers or ballast tanks with opposite ends of the pontoons tapering. The pontoons however 42 may be of any shape and size. The flow passage between the pontoons or floats is preferably of a circular cross-section but may be of other cross sections. The impeller assembly may also be of different configurations other than that described and illustrated and may carry only a single blade assembly or rotor or a plurality of blade assemblies or rotors as described.

The terms "comprising" or "comprises" as used throughout the specification are taken to specify the presence of the stated features, integers and components referred to but not preclude the presence or addition of one or more other feature/s, integer/s, components or group thereof.

All variations and modifications to the described embodiments as would be apparent to persons skilled in the art are deemed to fall within the broad scope and ambit of the invention as herein defined in the appended claims.

The invention claimed is:

1. An apparatus for extracting energy from flowing water, said apparatus comprising:
   a float assembly having a pair of spaced bodies, said bodies being at least partially buoyant;
   an elongated flow passage disposed between said bodies and extending longitudinally between said bodies, said flow passage having a partially circular cross-section;
   a plurality of flow guiding vanes disposed within said flow passage and extending longitudinally for substantially the length of the flow passage and extending substantially parallel to a longitudinal axis of the flow passage;
   an impeller assembly disposed in said flow passage, said impeller assembly including:
     a central axle or axles;
     at least one pair of spaced-apart impellers mounted on said axle or axles for rotation therewith; and
     a support that supports said axle or axles centrally in said flow passage to extend said axle or axles longitudinally in said flow passage;
   said apparatus being at least partially submerged in a body of water and at least partially submerging said flow passage, said impeller assembly rotating upon flow of water through said passage; and a device disposed on said float assembly for extracting energy from said rotating impeller assembly.

2. The apparatus as claimed in claim 1, wherein
said bodies are hollow ballast tanks or chambers adapted to be selectively filled or emptied of water; and
said bodies have a variable buoyancy to enable the apparatus to be submerged or partly submerged in water.

3. The apparatus as claimed in claim 2, wherein
said bodies of the float assembly include a pair of spaced floats, pontoons or hulls that define said hollow ballast tanks or chambers; and
said floats, pontoons or hulls having inner opposing walls, said inner opposing walls of said spaced floats, pontoons or hulls defining at least part of the flow passage.

4. The apparatus as claimed in claim 3, wherein each said inner wall has a partially circular concave surface that defines at least part of the inner surface of the flow passage.

5. The apparatus as claimed in claim 3, wherein said floats, pontoons or hulls extend downwardly to be level with or extend below the lower side of the flow passage.

6. The apparatus as claimed in claim 1, wherein
said flow passage is defined by an elongated flow passage-defining member supported between the floats, pontoons or hulls; and
said flow passage defining member is a tubular or partially tubular member, said flow passage defining member being open on its lower side or fully enclosed around its periphery.

7. The apparatus as claimed in claim 1, wherein said float assembly has leading and trailing ends and wherein inner surfaces of the float assembly at said leading and trailing ends converge toward each other to define a throat which tapers in cross section toward the flow passage to direct water flow toward the flow passage.

8. The apparatus as claimed in claim 1, wherein said float assembly includes at least at its operative leading end, an end member that projects forwardly of the float assembly above the flow passage, said end member tapering forwardly to define a bow.

9. The apparatus as claimed in claim 8, wherein each end member is provided between opposing bodies and extends outwardly and longitudinally thereof.

10. The apparatus as claimed in claim 1, wherein a guard or shield is provided at the leading or trailing ends of the float assembly, or at the leading and trailing ends of the float assembly, to prevent debris or animals from passing into the flow passage.

11. The apparatus as claimed in claim 1, wherein said impeller assembly has a maximum diameter of up to 85% of the cross-section of the flow passage.

12. The apparatus as claimed in claim 1, wherein each said impeller includes a rotor having an inner hub, an outer ring and blades extending between the hub and ring.

13. The apparatus as claimed in claim 12, wherein each said impeller is mounted to said axle or axles via respective clutch assemblies, whereby rotation of one impeller is independent of the rotation of other impellers.

14. The apparatus as claimed in claim 12, wherein each said blade has a longitudinal axis and wherein each said blade is rotatable about said longitudinal axis, whereby the pitch of the blades is adjustable.

15. The apparatus as claimed in claim 1, wherein said impellers of said pair are located at opposite ends of the flow passage and include at least one intermediate therebetween, each intermediate impeller being of a smaller diameter than the opposite end impellers and wherein said flow passage is reduced in cross-section adjacent the intermediate impeller.

16. The apparatus as claimed in claim 1, wherein said axle or axles of the impeller assembly is coupled to an output shaft, said output shaft being adapted to drive the device disposed on said float assembly, the device disposed on said float assembly for extracting energy including an electrical generator, said generator being located on an upper side of the float assembly.

17. The apparatus as claimed in claim 1, in combination with a pile assembly, said pile assembly comprising an upstanding pile, a track extending along said pile, a carriage movable along said track and an assembly that couples said carriage to said apparatus.

18. An apparatus for extracting energy from flowing water, said apparatus comprising a float assembly having a pair of spaced buoyant bodies, an elongated flow passage disposed between said bodies and extending longitudinally between said bodies, said buoyant bodies extending below said flow passage whereby said flow passage is supported above a surface upon which said buoyant bodies rest, said flow passage having a circular cross-section, a plurality of flow guiding vanes disposed within said flow passage and extending longitudinally for substantially the length of the flow passage and extending substantially parallel to the longitudinal axis of the flow passage, an impeller assembly disposed in said flow passage, said impeller assembly including a central rotatable axle and at least one impeller mounted on said axle for rotation therewith, a support that supports said axle centrally in said flow passage to extend said axle longitudinally in said flow passage, an adjusting device that adjusts the buoyancy of said buoyant bodies to enable said flow passage to be submerged in water, said impeller assembly rotating upon flow of water through said passage, and a device disposed on said float assembly for extracting energy from said rotatable impeller assembly.

19. An apparatus for extracting energy from flowing water, said apparatus comprising a float assembly having a pair of spaced floats or hulls, said floats or hulls being at least partially buoyant, an elongated flow passage disposed between said floats or hulls and extending longitudinally thereof, a plurality of flow guiding vanes disposed within said flow passage and extending longitudinally for substantially the length of the flow passage and extending substantially parallel to the longitudinal axis of the flow passage, an impeller assembly disposed in said flow passage, said flow passage having an inner surface that has a substantially circular cross-section, each said float or hull having an inner wall, said inner walls of said floats or hulls opposing each other, each wall having a concave surface of a partially circular cross section that defines at least part of the inner surface of the flow passage, an adjusting device that adjusts the buoyancy of said floats or hulls to enable said flow passage to be submerged in a body of water, said impeller assembly rotating upon flow of water through said passage, and a device disposed on said float assembly for extracting energy from said rotatable impeller assembly.

* * * * *